Nov. 16, 1943.   W. U. WATSON   2,334,365
ELECTRICAL TRANSCRIBING MACHINE
Filed March 16, 1940   9 Sheets-Sheet 1
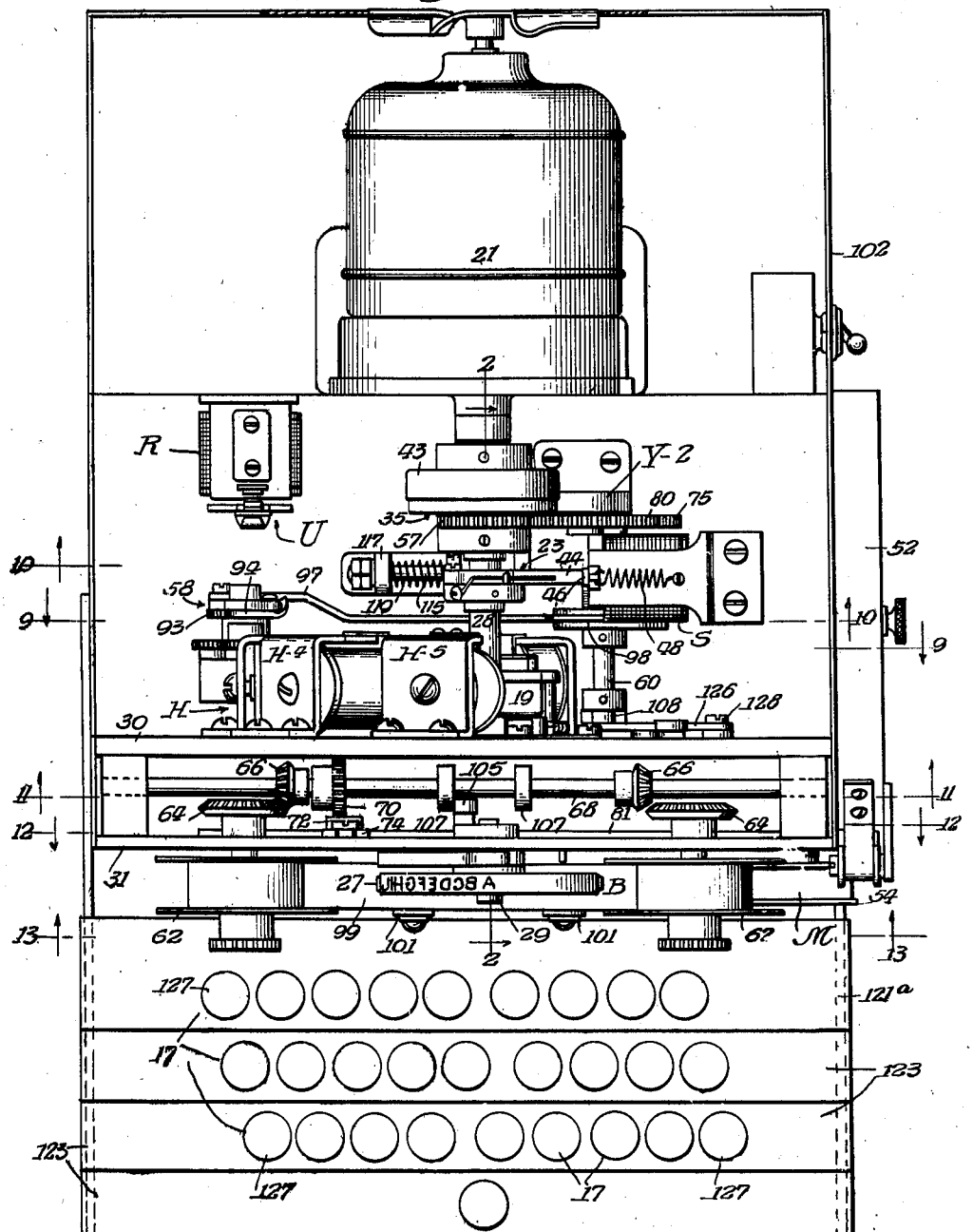
INVENTOR.
William U. Watson
BY John A. Marzall
ATTORNEY.

Nov. 16, 1943.  W. U. WATSON  2,334,365
ELECTRICAL TRANSCRIBING MACHINE
Filed March 16, 1940   9 Sheets-Sheet 2
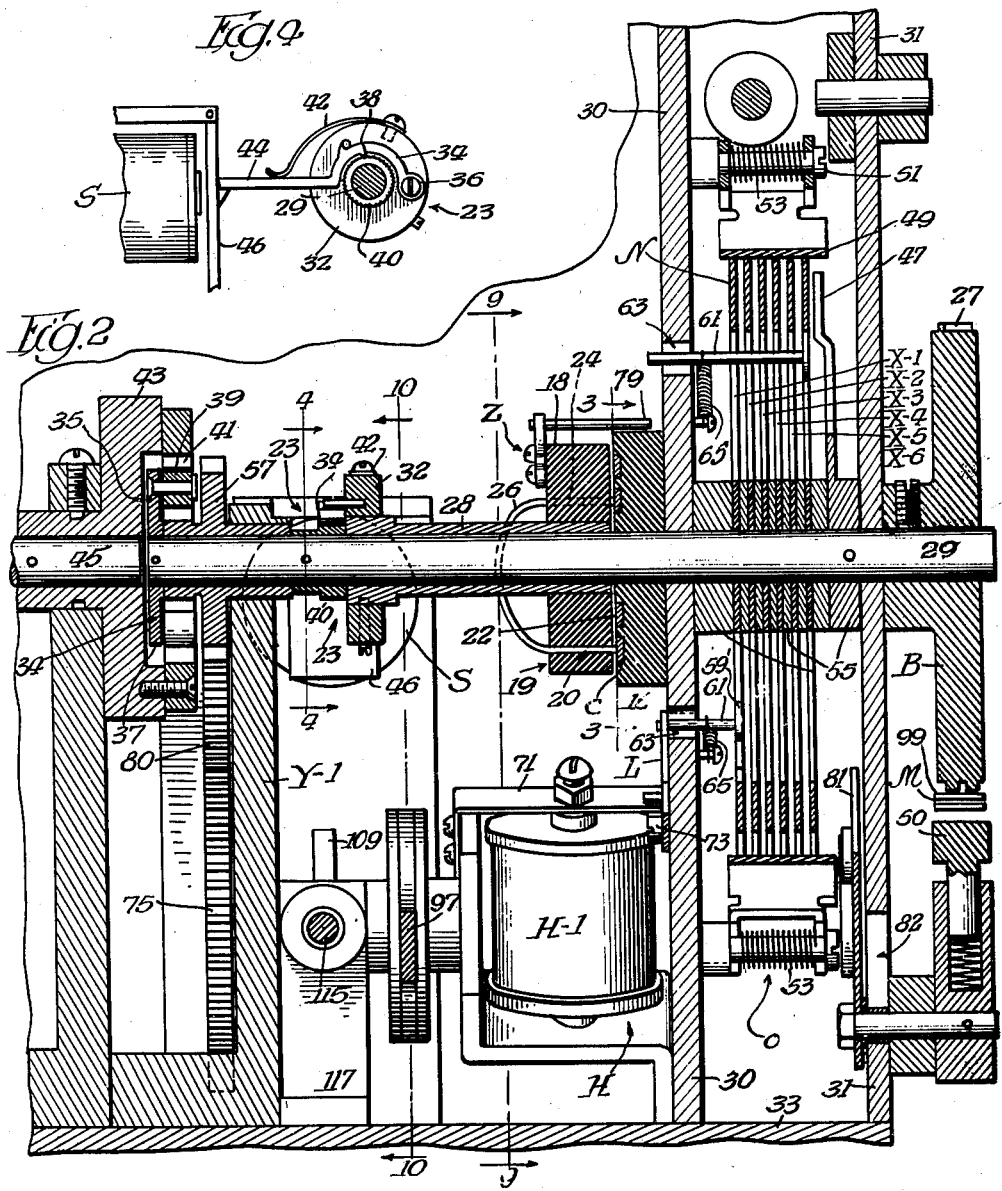
INVENTOR.
William U. Watson
BY John A. Marzall
ATTORNEY.

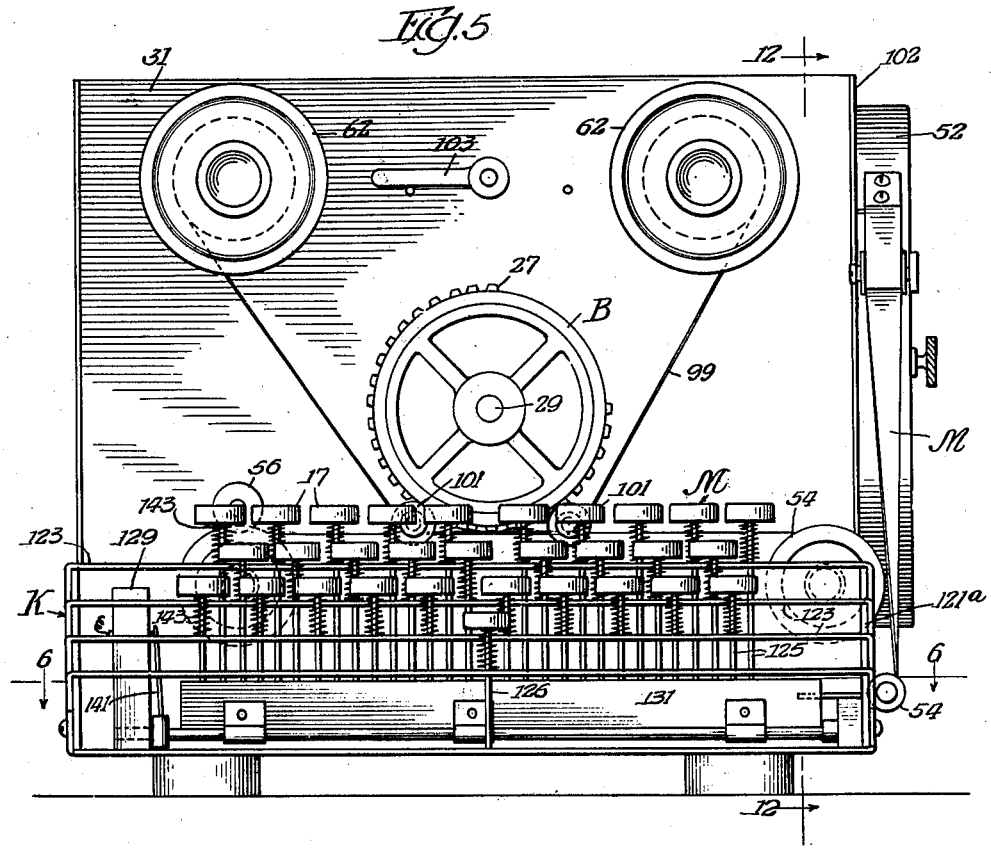
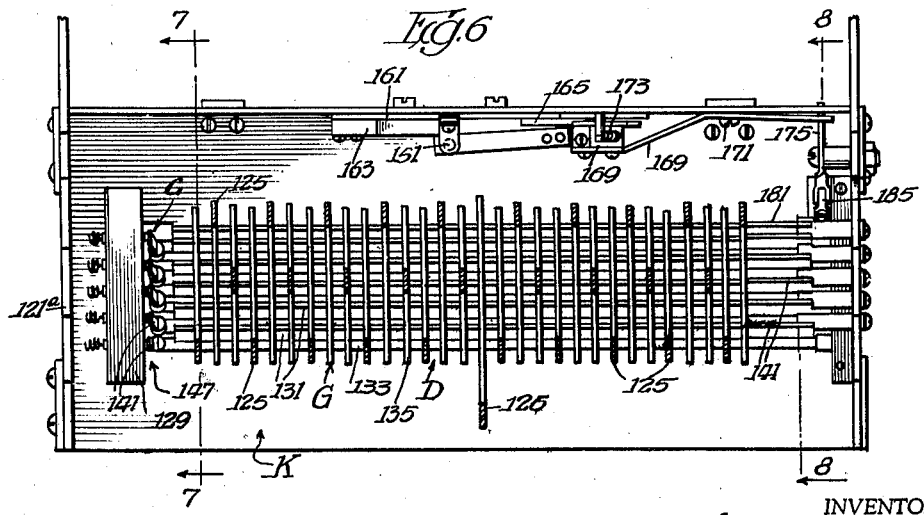

Nov. 16, 1943.   W. U. WATSON   2,334,365
ELECTRICAL TRANSCRIBING MACHINE
Filed March 16, 1940    9 Sheets-Sheet 4
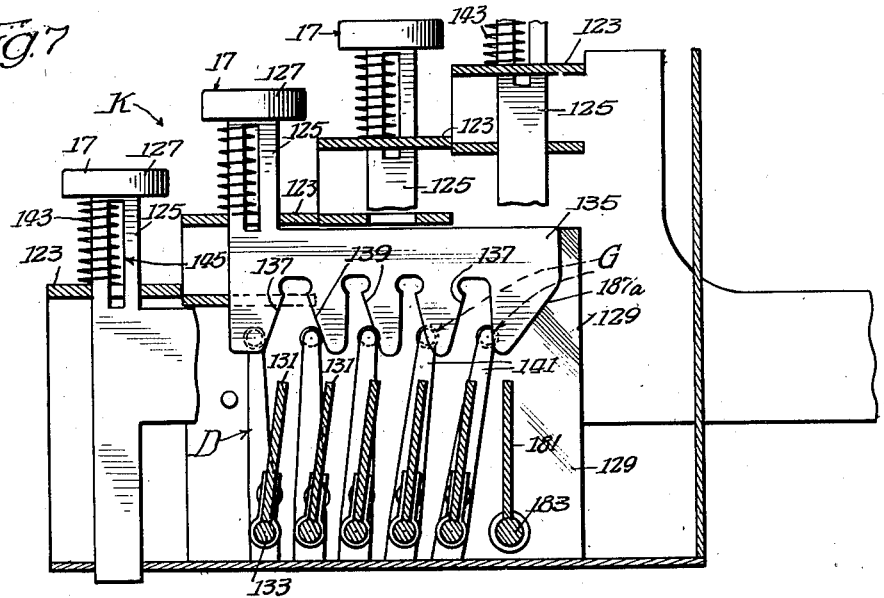
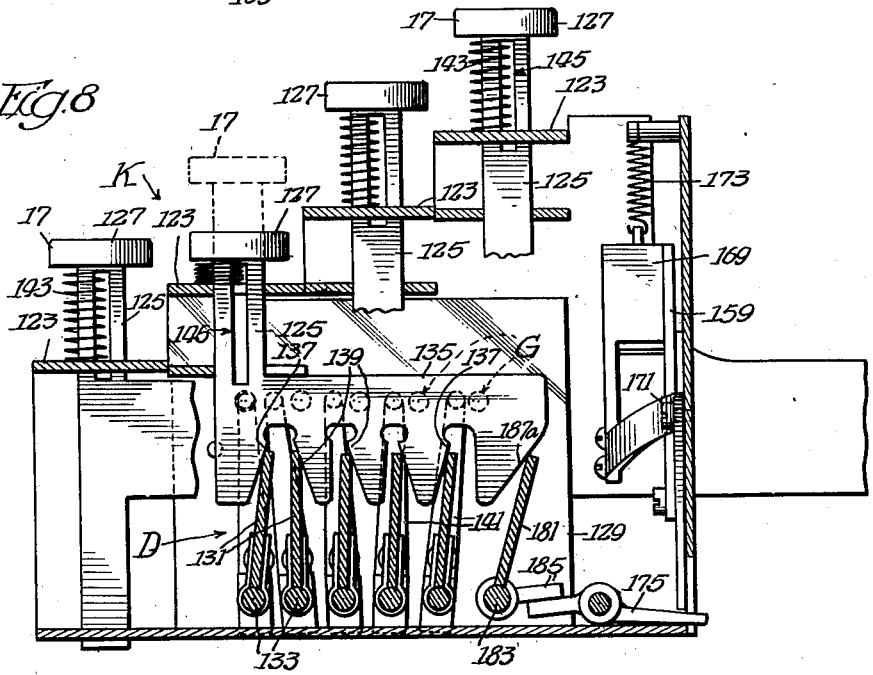
Inventor
William U. Watson
By John A. Marzall
Atty.

Nov. 16, 1943.  W. U. WATSON  2,334,365
ELECTRICAL TRANSCRIBING MACHINE
Filed March 16, 1940  9 Sheets-Sheet 5

INVENTOR.
William U. Watson
BY John A. Marzall
ATTORNEY.

Nov. 16, 1943.  W. U. WATSON  2,334,365
ELECTRICAL TRANSCRIBING MACHINE
Filed March 16, 1940   9 Sheets-Sheet 6
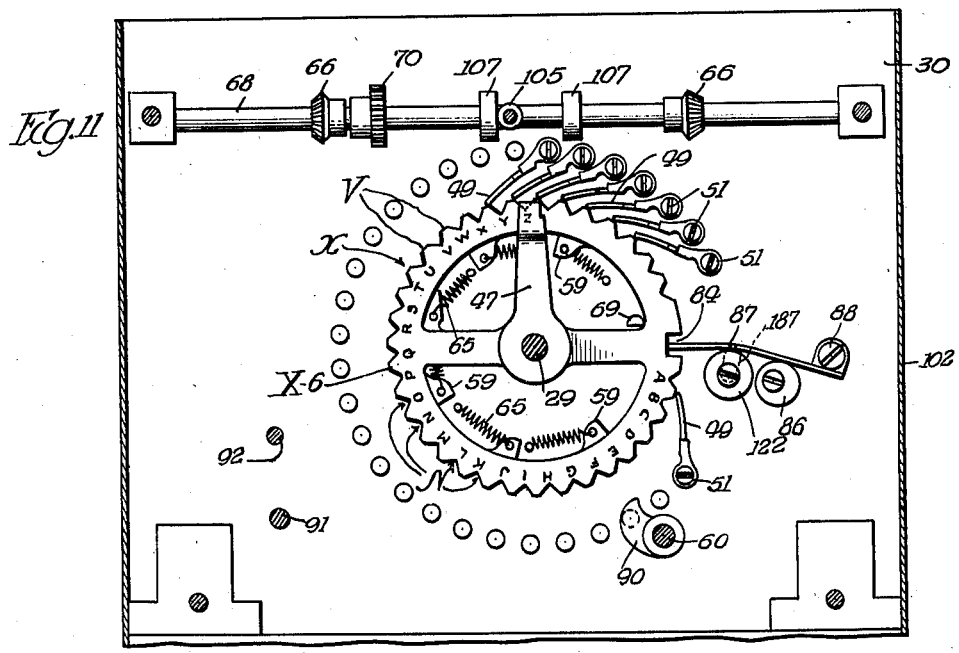
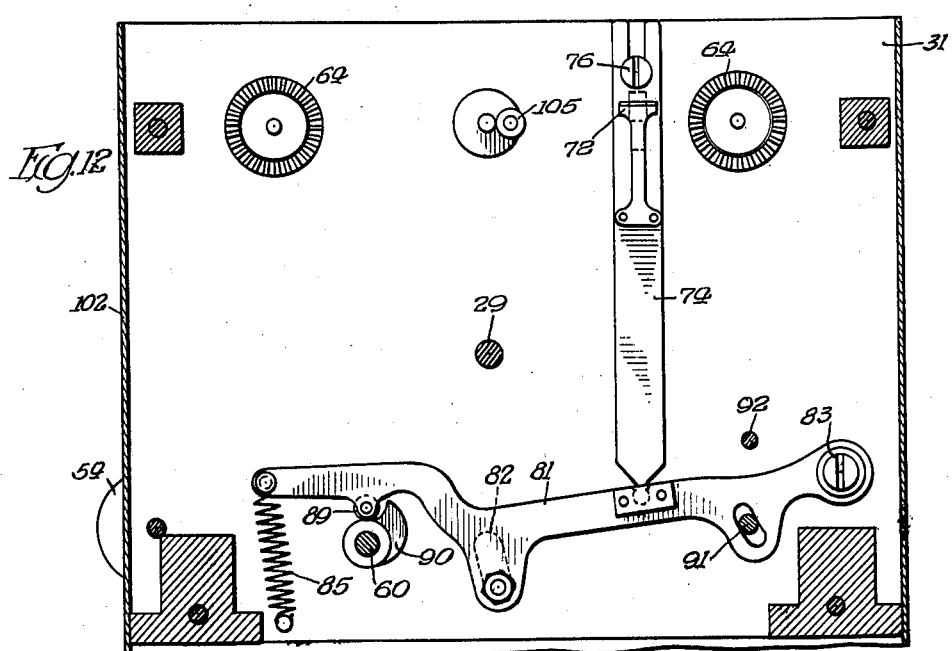
INVENTOR.
William U. Watson
BY John A. Marzall
ATTORNEY.

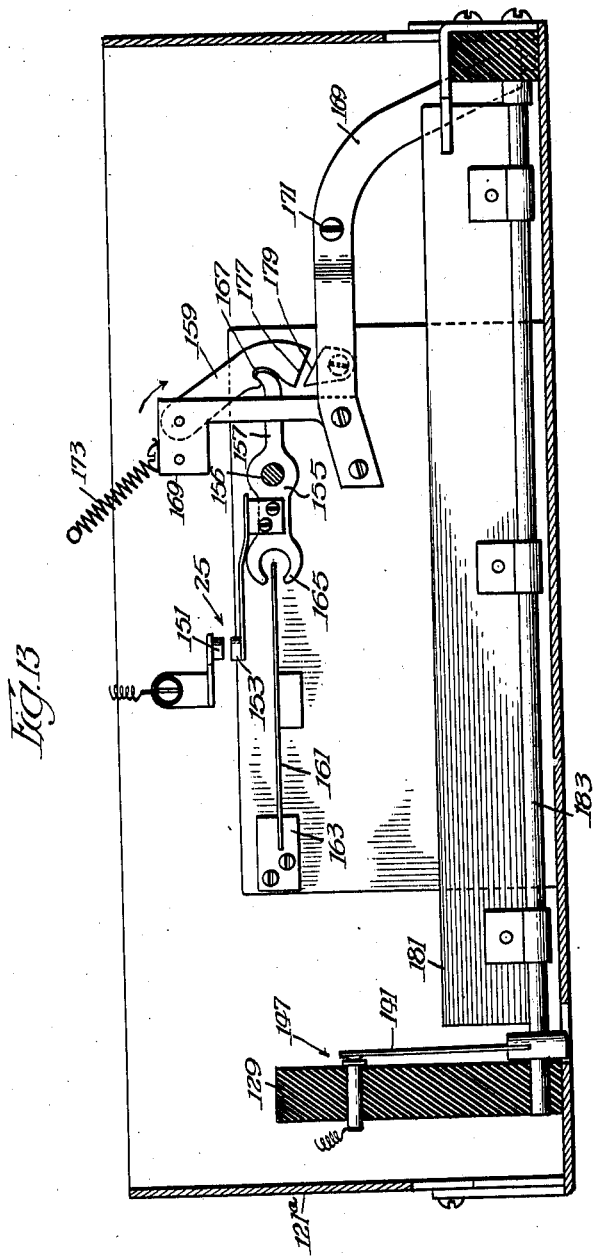
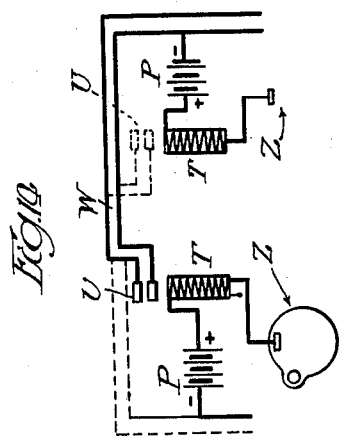

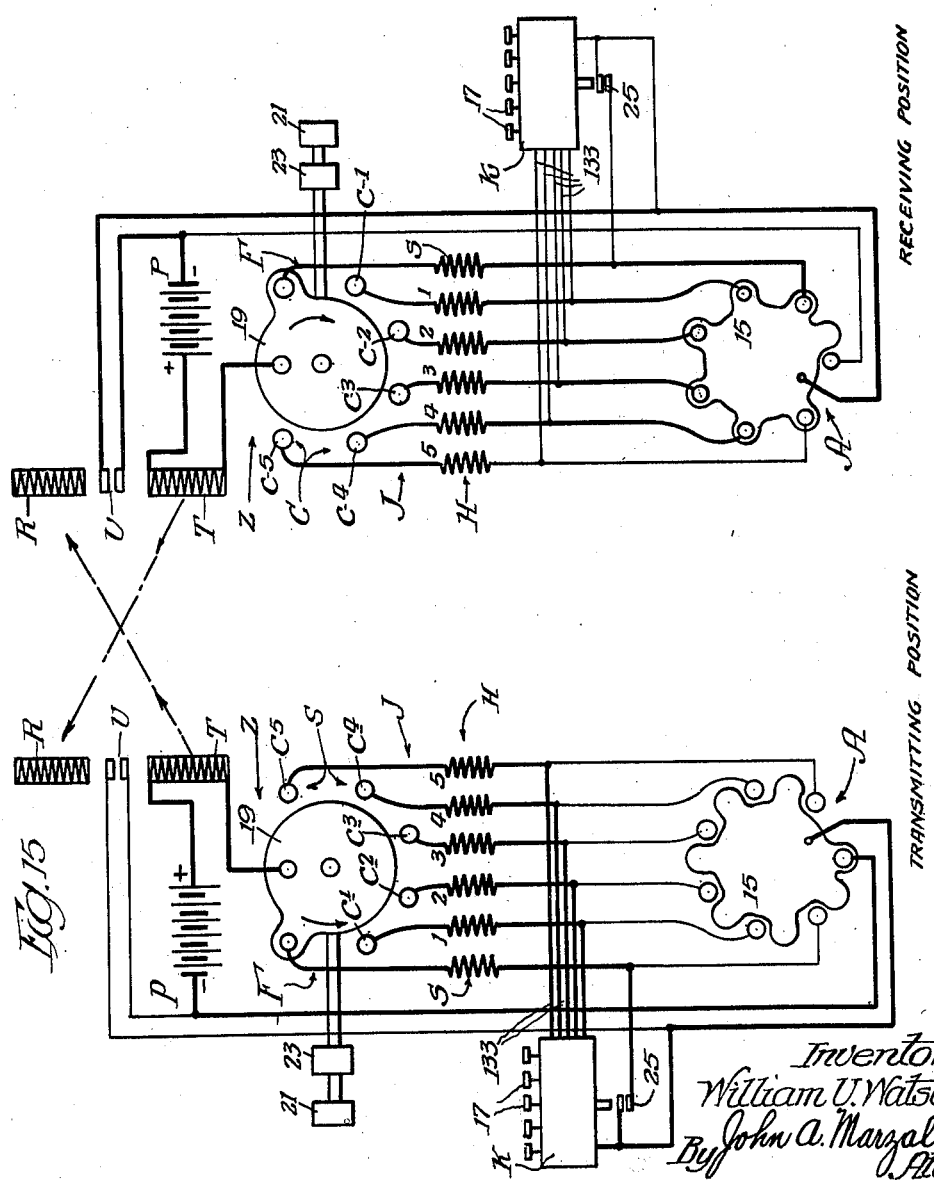

Inventor
William U. Watson
By John A. Marzall
Atty.

Patented Nov. 16, 1943

2,334,365

UNITED STATES PATENT OFFICE 2,334,365

ELECTRICAL TRANSCRIBING MACHINE

William U. Watson, Chicago, Ill.

Application March 16, 1940, Serial No. 324,327

35 Claims. (Cl. 178—34)

My invention relates in general to electrical translation and has more particular reference to a communication system, the invention, in its more specific aspects, pertaining to equipment for transmitting typewritten characters and reproducing the same at a remote station in response to the actuation of a transmitter.

An important object is to provide electrical and mechanical equipment for producing interdistinguishable electrical impulse trains adapted for transference to a receiver station in response to selective actuation of a transmitter, and to provide equipment at the receiving station for applying the impulse trains to the performance of differentiated operations, more particularly the selective operation of typewriting equipment.

Another important object is to produce distinguishable impulse trains for transmission by selectively energizing a plurality of coding circuits in a predetermined timed relationship; a further object being to provide receiver apparatus operable in response to the transmission of such coded impulses and embodying a plurality of decoding circuits operated in predetermined timed relationship for selectively actuating operable equipment in response to coded impulse trains.

Another important object is to utilize a rotary switch, driven at a predetermined rate of speed, for conditioning a plurality of coding circuits for activity in a predetermined timed relationship and simultaneously connecting selected circuits with a suitable power source to produce coded wave trains as a result of the successive action of the timing switch in connection with the selectively energized circuits.

Another important object is to selectively condition a plurality of coding circuits for operation under the control of a keyboard while simultaneously energizing the selected circuits in timed relationship by connecting all of the circuits successively with a suitable power source by means of a rotary switch driven at predetermined speed.

Another important object is to provide receiver equipment, including decoding circuits adapted for connection successively in timed relationship with a suitable power source, and including master control means operable, in response to the reception of a coded wave train, to selectively energize the decoding circuits in accordance with the characteristics of the wave train applied thereon; a further object being to utilize the decoding circuits, as by means of solenoids, for actuating selector mechanism in accordance with the characteristics of the coded wave trains applied on the receiver; a still further object being to utilize the selector mechanism, in conjunction with type printing equipment, to condition such equipment for the printing of a character corresponding with a distinguishable wave train applied on the receiver.

Another important object is to provide typewriter equipment adapted for operation under remote electrical control, including simplified means for operating the equipment in response to the application of distinguishable electrical wave trains on the equipment; a further object being to provide selector mechanism of simplified construction for the operation of the typewriting equipment.

Another important object is to provide selector mechanism comprising a plurality of selector wheels separately movable and having notches therein adapted for alignment in various angular positions with respect to the axes of the wheels when the wheels are relatively shifted in various combinations; a further object being to provide for latching the wheels individually in an inactive position and to selectively release the wheels, in accordance with the characteristics of a coded wave train, in order to set up a desired selector wheel combination.

Another important object is to utilize selector wheels of the character mentioned for the selection of one of a number of stop members and to utilize the selected stop member to stop a character wheel in position to print a character thereon corresponding with the selected stop.

Another important object is to provide for releasing selector wheels of the character mentioned for movement from inactive position by means of latch releasing solenoids selectively energized by the application thereto of a coded wave train through a timing switch operating successively on the solenoids in predetermined time relationship.

Another important object is to provide typewriting equipment, comprising a character wheel and driving means for normally rotating the same at a predetermined speed, including means operable at intervals to stop rotation of the wheel in position to print a selected character, in combination with printing mechanism drivingly connected with said driving means and set in operation upon the stoppage of the character wheel in printing position; a further object being to utilize planetary gearing through which the character wheel and the printing mechanism are both connected with the driving means so that the printing operation may be accomplished only when the character wheel shall have been stopped in position to print a selected character.

Another important object is to provide printing mechanism, including a character wheel adapted normally to be maintained in continuous rotation and at intervals to be stopped in printing position, in combination with selector means for determining the angular position of the wheel when stopped, and a rotary timing switch normally inactive but connectable with the character wheel for turning movement therewith for the actuation of the selector mechanism under the control of the timing switch.

Another important object is to provide combined apparatus for sending and receiving coded electrical impulses adapted for selective application in the operation of a type printing mechanism forming a part of the combined apparatus, whereby the device may be used either for sending coded impulses under the control of a keyboard forming a part of the equipment, or for receiving coded electrical impulses and reproducing the same as typewritten characters, the equipment further being adapted to reproduce the typewritten message at the transmitter as well as at the receiver.

Another important object is to provide combined equipment adapted to be used selectively for transmitting or receiving typewritten messages, and including coding circuits adapted to be selectively energized under the control of a timing switch for the reception and/or transmission of coded electrical wave trains, and including typewriting equipment and keyboard equipment adapted alternately to be connected with the coding circuits to constitute the apparatus either for receiving or for sending messages.

Another important object resides in providing an improved keyboard for the selective control of coding circuits in apparatus of the character mentioned; a further object being to provide keyboard mechanism, including a plurality of bus bars for connection with coding circuits and key bars, each under the control of a separate key and each electrically connected with a different combination of bus bars, whereby a desired combination of coding circuits may be conditioned for activity in response to the operation of a corresponding key, each key controlling a different bus bar combination.

Another important object resides in providing an improved key controlled switch for connecting a predetermined combination of bus bars in circuit for coding purposes.

Another important object is to provide a quick opening switch, more particularly for use in combination with a keyboard, the switch being adapted to open instantly after closure thereof, switch opening movement being independent of the maintenance of switch closing pressure after the switch has closed; a further object being to provide a switch in combination with a switch closing member adapted for predetermined switch closing movement and formed to release the switch for opening movement during the switch closing movement of the switch closing member; a still further object being to form the switch closing member as a dog having driving connection with the switch during switch closing movement, and means for releasing the dog during or at the conclusion of switch closing movement, whereby the switch may instantly reopen while the dog is at the limit of its switch closing travel.

Among the other numerous important objects and advantages is to provide a neat, compact apparatus of the character mentioned, having a minimum number of relatively simple operating parts; to provide apparatus which is positive in action and adapted to afford satisfactory performance throughout extended service life, and in general to provide inexpensive remotely controlled typewriter equipment adapted for use in wired as well as wireless communication systems.

The foregoing and numerous other important objects, advantages, and inherent functions of the invention will become apparent as the same is more fully understood from the following description which, taken in conjunction with the accompanying drawings, discloses a preferred embodiment of the invention.

Referring to the drawings:

Figure 1 is a top plan view of a typewriter mechanism embodying my present invention;

Figure 2 is a sectional view taken substantially along the line 2—2 in Figure 1;

Figure 16:
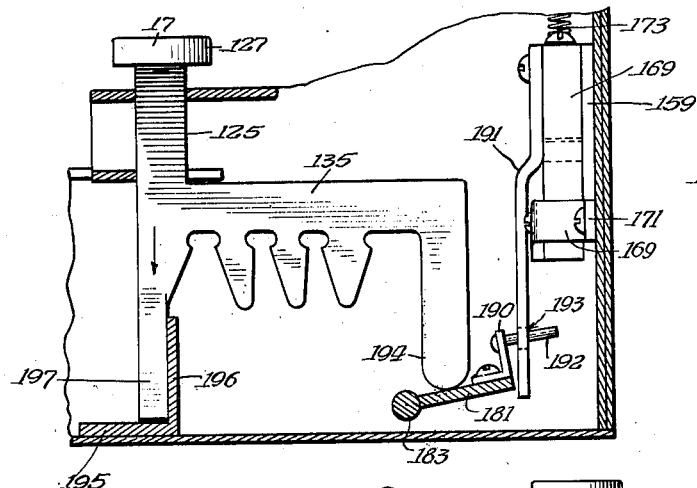
Figure 17:
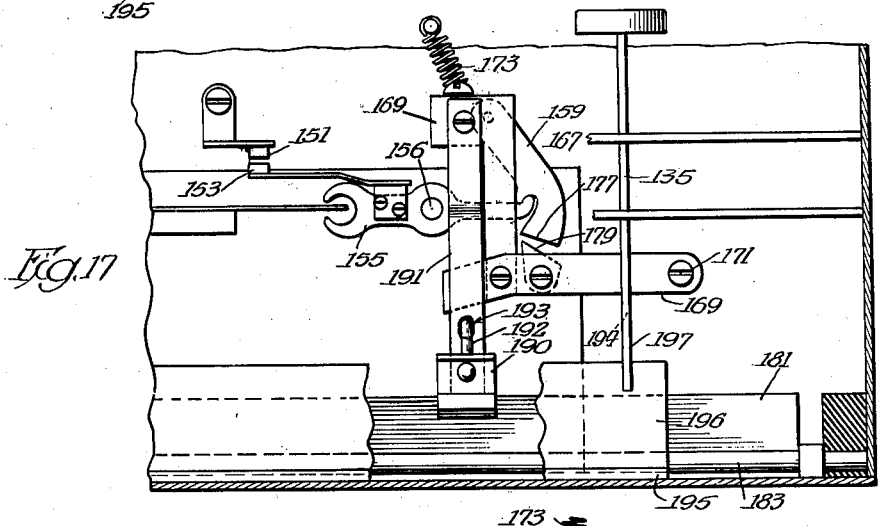

Figures 3 and 4 are sectional views taken substantially along the lines 3—3 and 4—4 in Figure 2;

Figure 5 is a front elevational view of the device shown in Figure 1;

Figure 6 is a sectional view taken along the line 6—6 in Figure 5;

Figures 7 and 8 are sectional views taken substantially along the line 7—7 in Figure 6;

Figures 9, 10, 11, 12 and 13, respectively, are sectional views taken subtsantially along the lines 9—9, 10—10, 11—11, 12—12 and 13—13 in Figure 1;

Figures 14 and 15 are wiring diagrams of the electrical devices and connections;

Figure 16 is a detail view similar to Figure 8 showing a modified arrangement of a blade, a coding bar and switch operating mechanism;

Figure 17 is a detail elevational view of the structure shown in Figure 16; and

Figure 18:
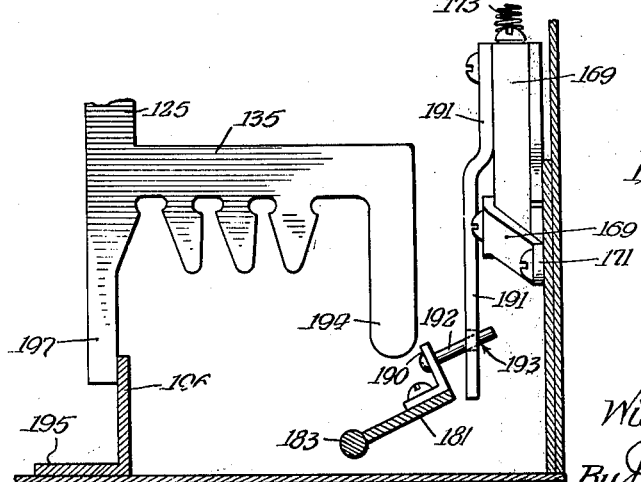

Figure 18 is a view similar to Figure 16 but showing the parts in normal position.

To illustrate my invention, I have shown on the drawings a translation system and associated typewriting means, whereby messages typed at a sending station may be transferred and instantaneously received and reproduced at a receiving station, the present invention relating more particularly to the typewriting and reproducing apparatus, and including associated means responsive to the action of writing at the sending station to produce coded electrical effects capable of transmission to the receiving station, and means for interpreting and applying electrical effects thus received to produce writing at the receiving station corresponding with the writing action at the sending station.

In accordance with my present invention, messages are sent, a character at a time, by setting in motion a combination of electrical and mechanical elements which perform a complete operating cycle in transmitting a single character. The operating cycle is initiated by pressing a selected key corresponding with the character to be sent, thus causing the transmitter to produce a train of electrical effects comprising impulses produced in timed sequence by the action of a timer switch driven at constant speed and operating in conjunction with starting and selectively conditionable coding circuits. The act of selecting and pressing a key conditions certain of the coding circuits for action during the operating cycle, each key controlling a different combination of circuits so that the electrical impulses produced comprise wave trains mechanically coded by the action of the timer. These wave trains each include an initial or starting impulse which, when applied on the receiver by means of a starting circuit, starts a timer switch in operation at a speed which is the same or approximately the same as that of the timer switch at the transmitter. The timer switch at the receiver, in conjunction with a plurality of coding circuits, applies the coded train of impulses to relays which operate a mechanical selector and cause the character corresponding to the coded train to be printed.

It will be understood, of course, that the invention is not necessarily limited to any particular means for transmitting the coded electrical effects, but that any suitable expedient, including wired or wireless transmission means, may be employed for transmitting the electrical effects between the sending and receiving stations; and while it is, of course, not essential that the equipment at the sending and receiving stations be identical, for manufacturing convenience as well as for convenience of operation, I prefer to provide combined transmitter-receiver equipment at each station adapted not only to send but also to receive typewritten messages, to the end that messages may be sent in either direction from either station. It is thought that the advantage of thus providing combined transmitter-receiver mechanism will be obvious, since the major portion of the apparatus, including the starting and coding circuits and the timer switch, which are active when the device is in use as a transmitter, may also be utilized when the device is functioning as a receiver. The simplification and avoidance of duplication of parts accomplished by constructing the apparatus as a combined transmitter-receiver will be readily apparent as the invention is more fully understood, although it is obvious that the equipment may be built for sending or for receiving purposes only.

THE ELECTRICAL SYSTEM

The diagram of connections, Figure 15, illustrates a pair of sender-receiver devices, one of which is shown in sending and the other in receiving position. These devices each comprise a timer switch forming coding means Z at each of the sending and receiving stations, the said timer switch preferably comprising a rotary circuit controlling member 19 adapted successively to engage a plurality of contacts C during rotary movement of the member 19 through a complete operating cycle. The timer switch Z is adapted, in conjunction with a plurality of coding circuits J and a starting circuit F, each of which is connected with one of the contacts C of the control device Z, to produce, under the control of a keyboard K when operating as a transmitter, any selected one of a number of trains of coded electrical effects capable of being transmitted to and made effective at the receiving station to actuate operable means in response to the coded effects transmitted.

The member 19, both in the transmitter and in the receiver, normally occupies a starting position in engagement with the contact C of the starting circuit F, and is connected with the transmission means T and a power source P which, in the illustrated embodiment, comprises a direct current source, although it is obvious that other than direct current may be employed for the purpose of energizing the device. The coding circuits J and the starting circuit F may be connected with selector switch means A, comprising a turnable member 15, and a plurality of contacts connected with said circuits J and F, and operable to condition the device as a receiver by connecting the circuits F and J with the power source directly, and alternately to condition the device for sending by placing the circuits under control of the keyboard K.

The transmitter

The coding circuits, at the sending station, are associated with selectively operable circuit conditioning means controlled by the typewriter keyboard K. This keyboard comprises manually depressible keys 17, each of which, when depressed, conditions a corresponding combination of circuits J for activity during the sending cycle, others of the circuits J remaining inactive. Each of the keys 17 controls a different combination of circuits J, and I prefer to employ a total of five circuits J and to condition these five circuits for activity in various combinations by means of the keyboard, since five circuits will give a sufficient number of different active circuit combinations to provide a different combination for each of the alphabetical, numeral and punctuation symbols required in a typewriter keyboard. It will be apparent, however, that provision for additional combinations may be made by increasing the number of circuits J.

It will be obvious also that the circuits J may be conditioned for activity in any preferred fashion, although, as shown in the drawings, I prefer to condition a circuit for activity by closing a switch therein or by actuating a circuit controlling element associated therewith in response to depression of a selected key 17.

The rotary contact member 19 is adapted to be driven at substantially uniform speed by any suitable means, such as a synchronous electric motor 21, through a clutch coupling 23 which is normally in uncoupled position, disabling the driving connection between the motor 21 and the member 19, which normally occupies the starting position shown in contact with the starting circuit F. While the apparatus is in operation, the motor 21 is continuously turning, and the clutch means 23 is adapted when activated, to couple the member 19 with the motor and permit the member 19 to be turned through one complete cycle of rotation from the starting position shown at the synchronous speed of the motor.

The clutch 23 is under the influence of a solenoid S in the starting circuit, which is controlled, Fig. 13, by a switch 25 when the device is in condition for sending. Closure of the switch 25, when the member 19 is in the starting position shown, energizes the starting circuit F through the power source P, actuates the clutch 23 and causes the member 19 to engage the contacts C successively during one complete revolution cycle of the member 19, the clutch being released and the member 19 stopped in starting position at the end of the cycle, Fig. 15.

It will be seen that, when operating as a transmitter, the timer switch, during one complete cycle, successively connects the power source and the transmission means T in series with the coding circuits J, some or all of which are connected, through switch means at the keyboard K and the switch A, with the power source. The transmission means T consequently will be energized whenever the member 19 engages a contact C in passing the same, Fig. 15, providing the corresponding coding circuit is conditioned for activity by closure of its conditioning switch at the keyboard. If, for example, a selected key controlling the first, third and fifth coding circuits has been pressed, the transmitter will be energized when the member 19 engages the contacts C in the first, third and fifth circuits, as well as initially by closure of the switch 25, while member 19 engages the contact C in the starting circuit F. Under the conditions mentioned, however, the transmitter will not be energized while the member 19 passes the contacts C in the second and fourth coding circuits, and the coded wave train produced may be represented graphically as: XSX—XIX—O2O—X3X—O4O—X5X, in which X—X represents circuit activity and O—O indicates inactivity. By arranging the keys 17 to condition different combinations of circuits for activity, it will be noted that each key may be made to control the production of a characteristic coded impulse train different from the trains produced under the control of every other key.

*Translation system*

Any preferred arrangement may be employed for translating the coded trains and applying the same on the receiver, and, to this end, I may constitute the transmitter T as a wireless radiator, or as a telegraph relay, or otherwise arrange the same to activate the remote receiver device, preferably by causing closure of a switch U forming a part of the receiver. If desired, the transmitter T may, as shown in Figure 14, comprise a relay coil, and the switch U may be located at the transmitter directly under the influence of the coil and connected with the receiver by the transmission line W. In such an event, the transmission line may be used in common for two-way transmission, as indicated in dotted lines in Figure 14. I prefer, however, to locate the receiver switches, as shown in Figure 15, and to provide suitable translation means, either wired or wireless, for closing the switch U at the receiving station when the transmission means T is energized at the sending station. To this end, I have shown pickup or relay means R at the receiving station adapted to be activated by the transmitter and to close the switch U whenever activated, Fig. 15.

*The receiver*

It will be seen that, when operating as a receiver, closure of the switch U, in response to the initial or starting impulse of the wave train, will complete a circuit through the power source P and the starting circuit F, thus energizing the solenoid S and engaging the clutch 23 to drivingly connect the member 19 of the timer switch Z with the driving means 21, which is operating continuously at a speed equal to that of the corresponding means at the sending station. The member 19 at the receiving station will thus be caused to rotate through one cycle or turn and successively to engage the co-operating contacts C in substantial synchronism with the periods of engagement of the member 19 with corresponding contacts at the sending station. If during the cycle, while the member 19 at the receiving station is engaged with a contact C, the switch U is caused to close, as a result of an impulse made effective through the transmission means T, the corresponding coding circuit J at the receiving station will be energized by the power source, but if the switch U remains open, while the member 19 passes a contact C at the sending station, the corresponding coding circuit at the receiving station will remain inactive.

It will be obvious from the foregoing that, during a cycle of operation, the coding circuits of the receiver will be selectively energized in fashion corresponding to that in which the coding circuits of the transmitter are selectively energized under keyboard control. Each of the coding circuits J includes a solenoid H which, when its corresponding circuit is energized, operates to perform an individual control function, and while in its broadest aspect my present invention is not necessarily restricted to the particular control functions exercised by the solenoids H, when the invention is applied in a typewriter device as shown in the drawing, I utilize the solenoids H to control the selective operation of printing mechanism.

In the illustrated embodiment, the printing mechanism comprises a character wheel B and selector mechanism O co-operatively associated with the character wheel and with the solenoids H and operable to stop the character wheel in a selected printing position corresponding to the particular coded impulse train that shall have been applied to the coding circuits. The wheel having been thus turned to printing position, actuating means driven by the motor 21, and set in operation when the character wheel is stopped, is provided for causing the selected character to be printed on a suitable print receiving sheet M which preferably is in tape-like form mounted on reels and guided across the character wheel in position to be printed thereby when the printing mechanism is actuated, suitable tape shifting mechanism driven by the motor 21 being provided to move the tape during the interval between the printing of successive characters, Fig. 2.

*Mechanical organization*

All of the operating parts of the apparatus are preferably mounted on a frame 33 which carries and embodies suitable bearings, brackets and mountings Y for the various elements employed. To this end, the frame 33 may comprise a relatively solid base plate upon which the motor 21 is securely mounted and electrically connected, as by means of a switch, with a suitable source of energizing power. The motor is preferably arranged at the rear of the device with its drive shaft 45 projecting forwardly for connection with the operating elements of the apparatus which preferably are mounted in the forward portions of the frame, Fig. 2.

While the broader aspects of my present invention are not necessarily limited to the particular printing mechanism illustrated, I prefer to accomplish printing by means of a character wheel B normally maintained in continuous rotation, which wheel may be instantly stopped in a desired angular position for the printing of a selected character and then released, the wheel, to this end, operating in conjunction with selector mechanism O under the control of the solenoids H, and which comprises the selector wheels X, Fig. 11, and a plurality of stops 49 selectively operable under control of the selector wheels X to stop the printing wheel in position to print a selected character. Preferably the wheel is driven by the motor 21, which also serves as the source of motivation for auxiliary mechanism, including tape shifting mechanism, ink ribbon shifting mechanism, and selector resetting mechanism, which operate in conjunction with the printing wheel in accomplishing the printing operation and in returning the apparatus to standby condition.

The printing wheel

The character wheel B preferably comprises a disk, Fig. 2, having the several characters 27 to be printed formed or mounted in spaced relationship on the periphery of the wheel. The wheel is mounted on a shaft 29 for rotation therewith, said shaft, in the illustrated embodiment, being supported by a pedestal Y—1 at one end and a pair of spaced plates, Figs. 1 and 2, 30 and 31 formed with openings through which the other end of the shaft extends, the plates and pedestal being suitably mounted and supported in spaced-apart relationship on the base 33. The character wheel B is carried on the shaft 29 adjacent and in front of the support plate 31. The shaft extends rearwardly of the rear face of the panel 30 and is drivingly connected with the motor 21 preferably by planetary gearing 35, whereby the shaft 29 may be rotated continuously and freely by the motor 21. To this end, the shaft is provided with a planetary gear disk 37 fixed thereon and which forms a spider carrying pinions 39, Fig. 2, which drivingly engage an internal gear 41. This internal gear 41 is carried by a head 43 which is fast on the drive shaft 45 of the motor 21, and consequently the shaft 29 may be continuously driven by the motor through the gearing unless a braking effect is applied on the shaft 29. Rotation of the shaft and wheel, however, because of the planetary gear drive, may be instantly stopped without, however, interfering with the operation of the motor merely by braking the shaft, and the rotation of the shaft may be instantly resumed by releasing the brake.

The braking mechanism

In order to brake the shaft 29 and cause the wheel B to be stopped in a desired angular position to print a desired one of the characters 27, the shaft 29 is provided, Fig. 11, with a brake arm 47 which turns with the shaft and extends radially thereof in position to engage any selected one of a plurality of equally spaced stop members 49 supported on the frame as on the plate 30 and disposed circularly about the axis of the shaft 29. These stop members are normally supported in position out of the path of movement of the arm 47 by the selector wheels X which form stop retaining means serving to hold the stops normally out of the path of movement of the brake arm. The selector wheels X, however, may be relatively shifted in order to permit any selected one of the stops 49 to be projected into the path of movement of the arm 47. Each stop 49 comprises a sheet metal stamping, forming a lever pivotally mounted on a pin 51 supported preferably on the plate 30. Each stop is normally urged by a spring 53, Fig. 2, in a direction to extend into the path of movement of the arm 47 when permitted so to do by the operation of the selector wheels X, thereby causing the printing wheel B to stop in the angular position required in printing the character 27 corresponding with the so projected stop member 49.

The selector mechanism

For the purpose of controlling the projection of a selected stop 49 in the path of the brake arm 47 to stop the wheel in a desired printing position, I prefer to utilize a plurality of selector wheels X which are conveniently supported on the shaft 29 between the frame plates 30 and 31 by means of spacers 55, it being understood that the selector wheels X are not drivingly connected with the shaft 29 which extends through openings in and is freely rotatable with respect to the selector wheels. The selector wheels, however, are angularly movable on the shaft and may be rocked thereon.

In the illustrated embodiment, I have shown six selector wheels formed with notches N in the periphery thereof. One of these wheels X—6 comprises a master control wheel in which the notches are equally spaced, defining lands V between adjacent notches. The other wheels are formed with unequally spaced notches so arranged therein that the notches thereof may be aligned at various points on the circumference of the wheels by shifting selected wheels in various combinations through a predetermined angular distance rockingly about the shaft 29. Each of the wheels X has an ear 59 formed with a stem 61 projecting laterally through a slot 63 in the wall 30, Fig. 2, the stems having latching ends extending rearwardly of the wall. A spring 65 is fastened to each of the stems 61 and is anchored on the wall 30 in position to draw the stem and attached selector wheel X in one direction about the shaft 29. Stop means in the form of a blade 87, pivoted as at 88, Fig. 11 and associated with a stop 86, is provided to limit the movement of all of the wheels X under the influence of the springs 65. To this end, the wheels X are all provided with aligned notches 84 which receive the end of the blade 87, and means drivingly connected is provided to move the blade 87 in a direction to shift the wheels X against the springs 65 in order to reset the wheels to standby position upon the conclusion of a printing operation, resetting movement being limited by the stop pin 69 which serves to align the wheels in standby position, as shown in Figure 11 of the drawings.

Figure 9:
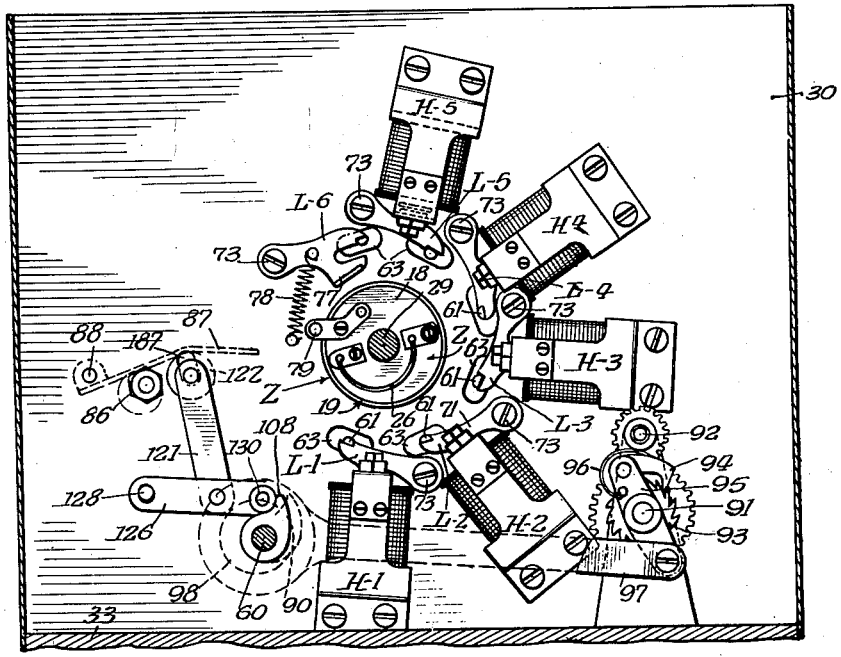

The timing switch Z comprises a base 16 of any suitable insulating material, preferably having an opening, Fig. 9, for the reception of the shaft 29. This base may conveniently be secured to the rear face of the wall 30 with the shaft extending through the opening in the base. The contacts C, Fig. 2 are mounted in the base circularly with respect to the axis of the shaft 29, and suitable connections are provided for electrically connecting each contact C with its corresponding connecting coil H. The rotating member 19 of the timing switch may be formed and interconnected in the electrical system of the apparatus in any suitable manner, although I prefer to utilize a disk-like block 18 of suitable insulating material as a mounting for the rotating contact member of the switch. This block is supported on the shaft 29 for rotation therewith when coupled thereto by means of the clutch 23, the block 18 being supported in position to rotate opposite the contacts C on the base 16. The block 18 is provided with brush means 20 in position to engage and form electrical contact with the several contacts C as the member 18 is rotated. In order to connect the brush 20 in the electrical system, I form the block 16 with a slip ring 22 mounted therein concentric with respect to the circularly arranged contact elements C. Means is provided for electrically connecting this slip ring 22 with the power source P, as through the transmission coil T, so that the connection may be of stationary, as distinguished from rotary character. The block 18, however, is provided with brush means 24 in position continuously to wipe upon the ring 22, the brushes 20 and 24 being electrically connected on the block 18 as by means of the conductor 26, Fig. 2.

In order to connect the timing switch Z with the shaft 29 for rotation therewith instantly upon the actuation of the starting coil S, the block 18 is fastened on a sleeve-like support 28 which embraces the shaft 29 and which is relatively rotatable with respect to the shaft. The sleeve 28 is formed with a collar 32 on which a clutch lever 34 is pivotally mounted, as at 36. This lever has a clutch tooth 38 in position to engage between the teeth of a clutch gear 40, Fig. 4 on the shaft 29 when the clutch lever is rotated on the collar 32 toward the axis of the shaft 29. The collar 32 carries a spring 42 which normally urges the lever on its pivot 36 in a direction to engage the tooth 38 with the gear 40. The lever 34, however, has an arm 44 extending substantially radially of the shaft 29. The starting solenoid S comprises a coil mounted in a suitable bracket on the frame 33 and has an associated armature 46 normally held in position projected from the solenoid, as by means of a spring 48. The armature forms a stop for engaging the arm 44 to hold the same in clutch disengaging position against the urge of the spring 42. When the clutch is disengaged, the sleeve 28 and the rotary switch member 19 of the switch Z will be held in starting or standby position with the contact brush 20 in engagement with the starting contact Cs, the position illustrated in wiring diagram, Figure 15. As soon as the starting solenoid S is energized, however, its associated armature 46 will be retracted and the arm 44, Figs. 1 and 4 released for engagement with the clutch gear 40 under the influence of the spring 42 to thereby drivingly connect the timing switch Z with the shaft 29. After the switch, Fig. 2 however, has made one complete rotative cycle, the starting solenoid will have become deenergized and its armature projected, under the influence of the spring 48, into position to engage the arm 44 and thus release the clutch and stop the timing switch in standby position.

The wheels X are all held in standby position by latches L comprising sheet metal arms, pivoted as at 73 on the rearward face of the wall 30, and having latching portions in position to engage the projecting ends of the pins 61 whereby to hold the wheels X in standby position determined by the stop pin 69 against the influence of the springs 65, Figs. 2 and 9.

The coding coils H are mounted on the rear of the frame wall 30 and are disposed circularly with respect to the shaft 29. These coils H each comprise a winding adapted, when energized, to shift a co-operating armature 71 in a direction to release the latch L with which it is associated, Fig. 9. These armatures preferably comprise spring blades having ends extending between spaced ears on the latches to normally hold the latches yieldingly in latching position when the coils are inactive and, upon actuation of the coil, to retract the latch and release the wheel for movement under influence of the spring 65. It will be noted that there are but five coils H in the illustrated embodiment which are operatively associated with the latches L—1 to 5 controlling the wheels X—1 to 5. The control pin 61 of the master wheel X—6 is operatively associated with the latch member L—6, which is not associated with any solenoid but is provided with a spring 78 to hold it in latching position. The latch L—6, Fig. 9, has a portion 77 in position to be engaged by a latch releasing pin 79 which is mechanically connected on the turnable member 18 of the coding switch. The latch release pin 79 consequently is adapted to release the latch L—6 against the latching urge of the spring 78 during the coding cycle in order to release the master wheel X—6 for movement under the influence of its associated spring 65; but the latch release pin 79 is positioned to release the latch L—6 during the coding cycle only after the member 19 has passed by the last of the contacts C of the coding switch, that is to say, after all of the coding coils H have had an opportunity to release each its associated selector wheel X.

During the operating cycle of the apparatus, as heretofore explained, the solenoids H are selectively energized during the rotation of the coding switch so that the selector wheels controlled by the solenoids will be released for tilting movement about the axis of the shaft 29 under the influence of the springs 65. The coding wheels X—1 to 5 have notches therein similar to the notches N of the master wheel X—6, but the notches contained in the wheels X—1 to 5 are not equally spaced apart but are arranged in the wheels in a fashion permitting alignment of notches at one angular position for each selected wheel combination or setup obtained by releasing the wheels selectively under the control of the coding switch Z. The notches, however, in the wheels X—1 to 5 are arranged to come into alignment opposite the free ends of the stop members 49 so as to permit the latch corresponding with the selected wheel combination to drop into the aligned notches when the master wheel is finally permitted to move by the release of the latch L—6 after the coding switch member 19, during its operating cycle, has engaged all of the contacts C—1 to 5, Fig. 15.

While the selected combination is being set up by the release of the wheels X—1 to 5, it will be noted that the master wheel X—6 remains in position such that each of the stops 49 rests upon a corresponding land V of the master wheel. After the timing switch has successively completed contact with the contacts C—1 to 5, the trip pin 79 on the timing switch releases the latch L—6, thereby permitting the master wheel X—6 to move under the influence of its connected spring 65, thereby allowing the selected stop 49 to drop into the aligned notches of the wheels and to move into position to engage and stop the arm 47.

When the master wheel is thus released, it should be understood that all of the stops except the selected stop will be held in retracted position with the free ends of the stops 49 bearing upon land portions of the selector wheels X—1 to 5. The selected stop, however, will be in the path of movement of the arm 47 and will consequently engage the same and stop rotation of the shaft 29 with the wheel in position to print the character 27 corresponding to the selected stop. As soon as the printing wheel is thus stopped in a desired printing position, a countershaft 60, which is suitably journaled on the frame and drivingly connected with the motor 21 through the gearing 35, will start on its operating cycle, at the conclusion of which a cam 108 on the shaft 60, Fig. 9, will operate to shift the resetting member 87, thus returning all of the selector wheels X, including the master wheel X—6, to standby position, thereby forcing the selected stop out of the path of the arm 47 and instantly permitting the shaft 29 to resume rotation with the countershaft substantially in starting or standby position.

The printing mechanism

The printing wheel having been stopped in printing position, printing is accomplished by pressing the tape M, Figs. 2, 5 upon the edge of the printing wheel opposite the selected character to be printed on the tape. The tape is so pressed by means of a platen 50 preferably comprising a pad member, Fig. 2, yieldingly mounted, as by means of a spring, in a holder which is secured on a pin mounted on an arm 81 behind the plate 31, the pin extending from the arm through a slot 82, Fig. 12, in the plate 31. The arm 81 is pivoted, as at 83, on the plate 31 and is normally urged, as by the spring 85, in retracted position. The arm 81 is provided with a cam following roller 89 in position to ride on a cam 90 which is fastened on the countershaft 60, and which causes the arm to be shifted to press the platen 50 upon the printing wheel each time the shaft 60 is rotated.

Figure 10:
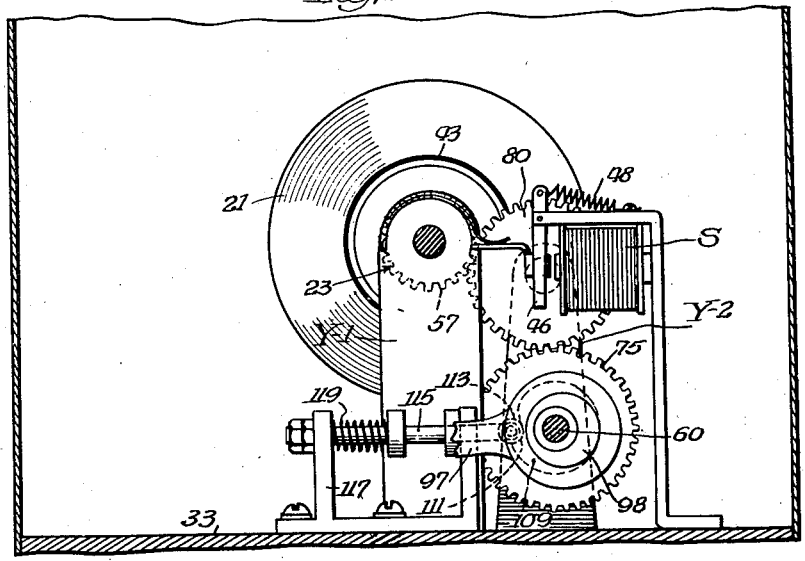

The countershaft 60 is suitably journaled at one end in an opening in the plate 30 and at the other, Fig. 10, in a pedestal Y—2 carried on the base 33, and is geared to the motor 21 through the planetary system 35 and permitted to turn only while the shaft 29 is held stationary during the printing operation. This is accomplished by means of a gear 75 on the shaft 69 in position meshing with an intermediate gear 80 which, in turn, is drivingly connected with a gear member 57, Fig. 2, journaled on the shaft 29 adjacent the planetary system 35. The gear member 57 has a portion meshing with the intermediate gear 80 and another portion meshing with the several pinions 39 of the planetary system 35. The countershaft 60 will make one complete operating turn or cycle, which commences when the shaft 29 is stopped by the arm 47 and one of the stop members 49, and which ends when the arm 47 is released by the return of the wheels X to the standby position at the conclusion of the printing cycle.

The tape feeding mechanism

The tape M, a supply of which is preferably mounted as a roll in a magazine 52, is drawn from the magazine and passes around guide rollers 54, thence between the printing wheel and the platen 50 to tape feeding rollers 56, which are drivingly connected with the motor 21 by means of ratchet mechanism 58 actuated by the countershaft 60, Fig. 5.

The magazine 52 may be of any suitable form and is preferably mounted on a plate 102 secured on the base 33 and extending at the ends of the spaced walls 30 and 31. One guide roll 54 is preferably mounted on a spindle or stem on the wall 31 and extends in front of said wall. The feeding rollers 56 likewise extend in front of the wall 31 and are mounted on shafts 91 and 92 which are journaled in openings, Fig. 12, formed in the plates 30 and 31, the shafts extending forwardly of the plate 31 and carrying the tape feeding rollers 56 which are in peripheral engagement to receive and feed the tape therebetween. The shafts 91 and 92 extend rearwardly of the wall 30 and are geared together, as shown in Figure 9 of the drawings, the end of the shaft 91 extending beyond its geared connection with the shaft 92 and being fitted with a ratchet wheel 93 in position to be driven by a pawl 94. This pawl is pivoted on an arm 95 and urged thereon by a spring 96 in a direction to engage the ratchet wheel. The arm 95 is rockably supported on the shaft 91 and has an end fastened to a connecting rod 97 which engages an eccentric cam 98 on the shaft 60 so that the ratchet will be actuated to turn the feed wheels 56 through a predetermined distance and thus advance the tape M each time the shaft 60 is rotated during the performance of a printing function, the cam 98 and the ratchet 93 being arranged to advance the tape after the platen 50 has completed the character printing operation but before the mechanism has been returned to standby condition at the conclusion of the operating cycle of the countershaft 60.

The ribbon feeding mechanism

The printing equipment also includes ribbon reels 62 conveniently mounted in front of the frame wall 31, Fig. 1, the reels being removably supported on spindles journaled in and extending through the wall 31 and provided with preferably beveled gears 64, Fig. 12, in position to be engaged by pinions 66, Figs. 1 and 11, on a shaft 68 which has driving connection with the countershaft 60, whereby to turn the same whenever the countershaft is actuated during the printing operation. To this end, the shaft 68 is provided with a ratchet wheel 70, Figs. 1 and 11, in position to be engaged by a leaf spring pawl 72, which is mounted on a slide 74, whereby to turn the ratchet wheel 70 when the slide 74 is reciprocated. The gears 64 and 66, and the shaft 68 with its ratchet wheel, are conveniently disposed between the frame plates 30 and 31, and the slide 74 is held upon the back of the plate 31 for sliding movement thereon by any suitable slide retaining means, such as the member 76. The slide is pivotally connected with the arm 81 and is moved to advance the ribbon feeding mechanism each time the arm 81 is actuated by the countershaft 60 during the printing operation, Fig. 12.

The reels 62, Fig. 5, are adapted to receive an inked ribbon 99 thereon and extending therebetween along a path determined by ribbon guiding rollers 101, disposed adjacent the path of movement of the tape M and on opposite sides of the printing wheel, whereby the ribbon 99 may extend in position between the tape M and the printing wheel. The reel driving mechanism serves to draw the ribbon from one reel onto the other, and I provide for reversing the movement of the ribbon under the control of a lever 103, which selectively controls the engagement between the gears 64 and the pinions 66. To this end, the shaft 68, carrying the pinion 66, may be moved in either direction axially in order to drivingly engage one or other of the pinions 66 with its co-operating gear 64, Fig. 1. The shaft may be held in either of the two driving positions by means of a cam 105 which is fastened on a shaft journaled in the plate 31 and carrying the control lever 103 in front of the plate. The cam is adapted to engage and press upon collars 107 providing shoulders on the shaft 68 in order to thrust and hold the shaft in position to drivingly connect one or other of the reels for ribbon winding movement.

At the conclusion of the printing cycle, Fig. 9, the resetting member 87 is actuated by a roller 122 which extends in front of the plate 30. This roller is carried on a stem extending in a slot 187 in the plate, the stem being supported on the end of an arm 121, the other end of which is pivoted on a lever 126. This lever 126 is pivotally supported, as at 128, preferably on the back of the wall 30, and has a roller 130 at its free end in position to engage and follow the cam 108 and thereby actuate the resetting member 87, Fig. 9.

To insure that the countershaft remains in standby position, I provide a cam latch comprising a circular disk 109, Fig. 10, on the countershaft 60 and provided with a notch 111 in position to receive a roller latch 113. The roller latch 113 is mounted on the end of a stem 115 which is supported for sliding movement in a bracket 117 on the frame 33. Spring means 119 is operatively associated with the stem 115 and the bracket 117 to yieldingly urge the stem and its roller toward and into engagement with the edge of the disk 109 with sufficient force to allow the roller to retain the disk and the shaft 60 in standby position. The roller, however, allows the shaft 60 to turn and thereby perform its operating cycle when the main shaft 29 is held from rotation.

The cam latch, comprising the circular disk 109 and the spring pressed roller latch 113, also aids in resetting the selector wheels X to standby condition after the completion of a character printing operation. When the selector wheels X are moved from a latching position toward reset position against the influence of the spring 65, the projected latch will be raised from the aligned notches N by the movement of the wheels X toward reset position and thus will release the arm 47 and the shaft 29 for rotation before the wheels X can reach reset position with the latches L in latching position with respect to the pins 61. As soon as the arm 47 is released, the driving mechanism, including the differential type planetary system 35, will permit the shaft 29 to rotate, immediately discontinuing rotation of the shaft 60. The shaft 60, however, provides the force through the cam 108 for actuating the wheel resetting lever 87 and consequently, if rotation of the shaft 60 is discontinued before the cam 108 has completed the resetting operation, the cam following roller 130 may remain poised upon the tip of the cam 108 in position just short of that necessary to reset the wheels X. The cam notch 111, however, is formed so that the action of the roller 113 therein will continue the turning movement of the shaft 60 after the arm 47 has been released in order to complete the wheel resetting operation.

As heretofore mentioned, it is not essential to construct the apparatus as a combined transmitter-receiver and where apparatus is constructed purely for sending purposes, it is, of course, unnecessary to include the conditioning switch A and its connections, nor is it necessary to include the decoding coils H in the transmitter equipment. Likewise, where apparatus is constructed for receiving purposes only, it is unnecessary to include the selector switch A or the keyboard and its connections, including the starting switch 25. This situation is indicated in the diagram, Figure 14, in which the equipment, essentially active during one way transmission, is indicated in heavy lines.

I prefer, however, for convenience and economy, to include the apparatus and connections for both sending and receiving in a single unit, and to this end, it will be noted that the coding circuits J of the transmitter may include the solenoids H—1 to 5, which are made active during the operating cycle of the sender in fashion identical with the activation of the corresponding solenoids of the receiver, and it is obvious that the reproducing apparatus at the sender may be actuated to print the message, as sent, at the transmitter as well as at the receiver, the selector wheels X, the character wheel B, and the other associated parts of the printing equipment operating at the transmitter during transmission in fashion identical to the operation of the corresponding equipment at the receiver.

The keyboard

The keyboard K preferably is mounted on the main frame 33 in position extending in front of the wall or panel 31. It should be understood, however, that the keyboard is not necessarily attached on the frame 33 but may be built as a separate unit positioned for operation remotely from the rest of the transmission equipment. As shown in the illustrated embodiment, the keyboard may comprise a support frame 121a, Figs. 6–8, providing a plurality of steps 123 for supporting the keys 17, the steps comprising preferably horizontally arranged plates formed with slots in spaced-apart alignment, each slot serving to slidingly receive and support the stem 125 of a key. The stems 125 project upwardly of the plates 123 and carry key finger pieces 127 thereon in position to be depressed by the operator of the equipment. Below the keys, the frame 121a carries switch mechanism operable to connect the circuits J selectively with the power source P in response to the manipulation of the keys 17. To this end, the frame 121a, Fig. 13, carries a mounting block 129 of insulating material in which is set stationary switch contacts G spaced apart therein, Figs. 6–8, there being a contact G for each of the coding circuits J. The frame also provides mounting for switch actuating members D selectively operable by the keys for opening and closing the switch operating mechanism, including movable switch blades 141 which, in combination with the stationary contacts G, form selectively operable switch means 147, there being a separate actuating means for each switch. Each switch actuating means comprises a blade 131 mounted for tilting movement about an axis at one edge of the blade, the blade, Figs. 7 and 8, preferably being secured at its pivoted edge on a pivot rod 133. The rods 133 of the several switch actuating devices preferably extend in parallel spaced relationship at the bottom of the frame 121a, the pivot rods being preferably journaled at their opposite ends at the opposite sides of the frame 121a with the blades 131 projecting upwardly of the rods. The insulating plate 129 forms a convenient means in which to journal the ends of the rods at one end of the frame 121a, and the rods each carry one of the switch blades 141 in position to engage and release a corresponding contact G when the rod is tilted in the frame, Figs. 6–8. The blades 131 extend between the opposite sides of the frame 121a beneath the keys 127, the stems of which are provided with plates comprising coding bars 135. These coding bars are provided with inclined cam surfaces formed for engagement with the blades 131 to move the same selectively in order to actuate the switches 147. It will be understood, of course, that the stem of each key carries a plate having switch actuating cam surfaces arranged therein differently from the cam surface arrangement in the coding bars of every other key. The coding bar, which is shown in Figures 7 and 8, respectively, in raised and in depressed switch actuating position, however, has inclined surfaces 137 for throwing the first and fifth of the switches to closed position, and surfaces 139 for throwing the second, third and fourth switches to open position when the key corresponding with said bar is depressed.

All of the switch blades 141 are electrically connected in any suitable or convenient fashion with the power source P, so that upon depression of a key 17, the circuits J will be selectively connected with the power source in accordance with the open or closed condition of the switches 147; each key 17 will set up a circuit combination different from the combination set up by every other key. In order normally to hold the keys in raised position and to return the same to raised position after having been depressed in setting up a circuit combination, the stem 125 of each key is provided with a spring 143 which is mounted around a portion of the stem between the finger piece 127 and the step 123 through which the key stem operates. To facilitate the application of and retention of the spring on the stem, each stem is preferably formed with a slot 145 in which the spring is assembled.

The keyboard also controls the starting switch 25 which is closed in response to the depression of any key 17. The cycle of operation of the equipment herein described, upon the closure of the switch 25, is so rapid as to be completed before a key 17, manually depressed, can be manually released. There is consequently no problem involved to insure that the switch 147 will remain closed to hold the selected circuits connected with the power source during the cycle of operation of the equipment. However, it is necessary to insure that the switch 25 be interrupted before completion of the operating cycle of the equipment, as otherwise the equipment may repeat its operating cycle if the switch 25 is in closed position when the timing switch Z reaches starting position at the conclusion of the operating cycle of the apparatus.

Means is provided whereby each of the keys 17, when struck, will close the switch 25; but the mechanism for closing the switch 25 is constituted to permit the switch 25 to open immediately after being closed, and to this end, I have provided a novel self-releasing mechanism for actuating the switch 25. The switch 25 is mounted preferably on the support frame, and where the keyboard is mounted on the frame 30, the switch 25 may conveniently be mounted on the panel member 102.

The switch 25, as shown in Figure 13, comprises a stationary contact member 151 preferably resiliently supported on a spring blade which is anchored on the support panel and insulated therefrom so that the contact member 151 may be electrically connected with the starting solenoid S. The switch also includes a shiftable contact member 153 carried preferably on a spring blade support which is mounted on a carrier lever 155. The carrier lever is pivoted, as at 156, on the support frame and has an actuating arm 157 extending in position to engage a switch closing dog 159. The member 155 is normally urged on its pivot in switch opening direction, as by spring means preferably comprising a spring blade 161 mounted at one end in a clamp 163 which is fastened on the support frame. The other end of the blade extends between a pair of abutments 165 formed on the carrier lever 155. The switch actuating dog 159 is formed with a notch 167 adapted to receive the end of the lever arm 157, and the dog is mounted and guided for movement from a starting position in engagement with the lever arm 157 in a direction outwardly therefrom, whereby the dog, during switch closing movement, may initially tilt the lever 155 in a direction and sufficiently to cause closure of the switch elements 151 and 153, and thereafter the continued movement of the dog will release the arm 157 from the notch 167 and permit switch opening movement rapidly under the influence of the spring 161, said spring being placed under tension as a result of switch closing movement of the lever 155.

The dog 159 is pivotally supported at one end on a lever 169 which is pivoted on the frame, as at 171, to move the pivoted end of the dog toward the end of the arm 157. The lever 169 and the dog are normally urged toward an initial or starting position by means of a spring 173, and the lever 169 may be moved from the initial position, in closing the switch 25, by an actuating lever 175 which is operatively connected with all of the keys 17 by means of a blade 181 similar to the blades 131 mounted for pivotal movement about one edge thereof on a stem 183, Fig. 8, which carries a finger 185 in position to actuate the lever 175. The coding bars 135 are all formed with an inclined cam surface 187a therein in position to engage the swinging edge of the blade 181 in order to throw the same in a direction to cause closure of the switch 25 when any key 17 is depressed. When the lever 175 is moved in closing the switch, the lever 169 will be moved to draw the dog 159 in a direction tangential with respect to the axis of the pivot 171, which is a direction across and away from the end of the lever 157. In order to assure release of the arm 157 from the notch 167, the dog, at its free end, is provided with a cam surface 177 in position to engage the inclined surface of a release cam 179 stationarily fastened, as on the frame, in the path of movement of the dog. After the dog has moved a predetermined distance in closing the switch 25, it will engage the stationary cam 179 which will throw the dog away from and out of engagement with the switch actuating arm 157 and permit the switch instantly to be opened by the action of the spring 161.

In actual practice it has been found preferable to eliminate the actuating bar 175, Figure 13, and cause the operation of the contacts 151, 153 by mechanism directly controlled and connected to the blade 181, Figures 16 to 18. In this latter embodiment the blade 181 is positioned in a relatively horizontal plane instead of in a relatively perpendicular plane as shown in Figures 7 and 8. An angle 190, Figures 16 to 18, may be fastened to the blade 181 and operatively connected to an arm 191 on the lever 169. The connection between the angle 190 to arm 191 comprises a pin 192 operatively carried by the angle and engageable with a slot 193 in the arm 191. The coding bar 135 has the cam edge 187a, Figures 7 and 8, omitted and in its place and stead there is provided a finger 194, Figures 16 to 18, which is adapted to directly engage the blade 181. By this latter arrangement, the lever 169 terminates at a point immediately adjacent the pivot 171; and the springs 143 may be omitted from the key stems 125 as it has been found that the spring 173 is sufficient to return the parts to their normal position after a key has been manually depressed. In operation, when a key lever 17 is depressed, a finger 194 on a coding bar 135 will directly engage the blade 181 and press the blade 181 downwardly to the position shown in Figure 16. Such depression causes the arm 191 to be pulled downwardly against the tension of the spring 173 because of the pin and slot connection 192, 193, and causes the switch closing dog 159 to move the carrier lever 155 on its pivot 156 to make the electrical connection between the contacts 153 and 151. Also to assure positive return of the key levers by the spring 173 and to overcome any tendency of canting of the keys, an angle 195 may be positioned on frame with a leg 196 of the angle in position to engage a stem 197 on the key, Figures 16 and 18.

The operating parts of the switch 25 are so arranged and its action correlated with the action of the keys 17 that the switch 25 will be closed substantially simultaneously with the closure of the key switch 147, the switch 25 reopening immediately after closure. This rapid action is accomplished in part by the arrangement of the levers 175 and 169, or the parts 190—194 and the lever 169, so that a very small movement imparted by the actuation of a key 17 produces a relatively large movement in the switch actuating dog 159.

It is thought that the invention and its numerous attendant advantages will be understood from the foregoing description, and it is obvious, of course, that numerous changes may be made in the form, construction, and arrangement of the several parts without departing from the spirit and scope of the invention or sacrificing any of its attendant advantages.

The invention is hereby claimed as follows:

1. A translation system including a transmission element to energize the same, comprising means forming a plurality of coding circuits, means selectively operable to activate various combinations of said circuits, cyclically operable means actuatable to successively connect the activated of said circuits with said transmission element to energize said element in accordance with coded wave trains corresponding respectively to a selected circuit combination, a normally open starting circuit including a switch closable to effect actuation of said cyclically operable means, a switch operating linkage drivingly connected to the switch and with said selectively operable means for closing the switch to close said starting circuit upon the activation of each circuit combination, and means operably associated with said switch for opening the same to open said starting circuit promptly after its closure.

2. A translation system including a transmission element and means to apply coded wave trains on said element to energize the same, comprising means forming a plurality of coding circuits, a keyboard including a group of individually operable keys, means operable under control of each key for conditioning a predetermined combination of said coding circuits for activation, means operable cyclically from and to a standby position to successively connect the activated of said circuits with said transmission element to energize said element with coded wave trains corresponding respectively to said circuit combinations, a normally open starting circuit including contact means under control of said cyclically operable means and closable, while said cyclically operable means is in said standby position, to effect operation of said cyclically operable means, means actuatable by the operation of any of said keys pursuant to conditioning its respective coded circuit, as aforesaid, to close said starting circuit, and means operably associated with the last named means for disabling the same to open said starting circuit promptly after the closing thereof.

3. A translation system including a transmission element and means to apply coded wave trains on said element to energize the same, comprising means forming a plurality of coding circuits, a keyboard including a group of individually operable keys, means operable under control of each key for conditioning a predetermined combination of said coding circuits for activation, means operable cyclically from and to a standby position to successively connect the activated of said circuits with said transmission element to energize said element with coded wave trains corresponding respectively to said circuit combinations, a normally open starting circuit including contact means under control of said cyclically operable means and closable, while said cyclically operable means is in said standby position, to effect operation of said cyclically operable means, a switch closable to close the normally open portion of said starting circuit, switch operating means comprising a linkage drivingly connected to the switch and with said key board for actuation by the operation of any of said keys pursuant to conditioning its respective coded circuit, as aforesaid, to quickly close said switch, and means included in said switch operating means for releasing said driving connection immediately after closing of the switch and effecting opening of the switch.

4. A translation system, including a response device, means to actuate the response device in accordance with a coded wave train comprising successively effective actuating impulses in timed relationship, decoding means comprising a plurality of operable devices operable in response to the actuation of said responsive device, a motor adapted for continuous operation, cyclically operable means drivable from said motor to successively condition said operable devices for operation during the operating cycle of said cyclically operable means, means operable in response to the initial impulse of said coded wave train for drivingly connecting said cyclically operable means with said motor to operate the cyclically operable means at a speed corresponding with the impulse frequency of the coded wave train whereby to make said wave train effective to predeterminedly actuate said operable devices, printing mechanism comprising a character wheel drivingly connected with said motor, selectively operable stop mechanism for stopping said character wheel in position to print a character corresponding with the selectively operated condition of said stop mechanism, operating means drivingly connected with said motor, means for setting said operating means in operation pursuant to the stoppage of said character wheel, said operating means comprising a printing platen, and means to reset said selective stop mechanism and to release said character wheel for continued rotation.

5. A translation system, including a response device, means to actuate the response device in accordance with a coded wave train made up of actuating impulses in timed succession, decoding means comprising a plurality of devices operable in response to the actuation of said responsive device, a motor adapted for continuous operation, cyclically operable means drivable from said motor to successively subject said operable devices to the control of said response device during the operating cycle of such cyclically operable means, means operable in response to the initial impulse of said coded wave train for drivingly connecting said cyclically operable means with said motor to operate said cyclically operable means at a speed corresponding with the impulse frequency of the coded wave train whereby to make said wave train effective to predeterminedly actuate said operable devices, printing mechanism comprising a character wheel drivingly connected with said motor, stop mechanism settable for stopping said character wheel in position to print a character corresponding with the predetermined actuation of said operable devices, said stop mechanism including selector mechanism comprising a plurality of selector wheels respectively controllably associated with said operable devices and rotatable between a standby position and a selecting position for setting said stop mechanism, means normally urging said wheels toward selecting position, a latch for releasably securing each wheel in standby position, and said latches each being under control of one of said operable devices, whereby each wheel can be released for rotation into selecting position upon the actuation of its corresponding operable device.

6. In a machine of the class described wherein there is a rotatable printing wheel stoppable to place selected of its printing characters in printing position, and wherein there are a plurality of operable devices operable in coded combinations according to signal impulses applied thereto, the combination of stop mechanism settable for stopping said character wheel in position to print a character corresponding with a coded combination of said operable devices, said stop mechanism including selector mechanism comprising a plurality of selector wheels respectively controllably associated with said operable devices and rotatable between a standby position and a selecting position for setting said stop mechanism, means normally urging said wheels toward selecting position, a latch for releasably securing each wheel in standby position, said latches being under respective control of said operable devices whereby any operable device upon operating will release the associated of said wheels for rotation into selecting position, said wheels having notches so constructed and arranged in the peripheries thereof that there is no unobstructed axial alignment of said notches on the several wheels at any of a plurality of circumferential positions thereabout when said wheels are all in the standby position, but that upon the movement of certain of said wheels to selecting position according to a coded combination of said operable devices there is such axial alignment of certain of said notches at a circumferential position corresponding to said coded combination and to a corresponding printing character upon said printing wheel, and selector bars disposed for entrance into aligned notches respectively at said circumferential positions to stop said printing wheel with its corresponding printing character in the printing position.

7. A translation device comprising a main frame, a character wheel rotatable on the frame, selector mechanism on the frame and operable to stop the character wheel in position to print a selected character, means forming a plurality of coding circuits having releasing means operatively associated with said selector mechanism for actuating the same, printing mechanism on the frame and comprising a printing platen movable to cause the character wheel, when in printing position, to print a character, resetting means for said selector mechanism, cyclically operable transmission means for driving said printing mechanism and including means for operating the resetting means, motive means and means drivingly connecting the motive means with said character wheel and with said transmission mechanism, whereby normally to rotate said character wheel and to drive said transmission mechanism through an operating cycle when said character wheel is stopped, means to apply coded wave trains on said coding circuits comprising cyclically operable means associated with said coding circuits to condition said circuits successively for activity in response to the application of a coded wave train thereon, and means operable, upon the application of a wave train to said circuits, to drivingly connect said cyclically operable means with said motor for operation through the complete operating cycle thereof.

8. A translation device as set forth in claim 7 and including a keyboard, means controllingly associated with said coding circuits to condition the same for activity in various circuit combinations under the control of the keys of said keyboard, said last named means operating through said last mentioned cyclically operable means, said keyboard including a starting switch connected with all of the keys for actuation when any key is operated to operate said means for drivingly connecting said cyclically operable means with said motor for operation through the complete operating cycle thereof, and a conditioning switch for connecting said coding circuits selectively for operation under the control of said keyboard or under the control of said receiver device, whereby the device may be operated either as a transmitter or a receiver.

9. Translating apparatus comprising a transmitter and a receiver for sending and receiving electrical impulses, a plurality of coding circuits common to both the transmitter and receiver, a printer, means operated by said coding circuits for operating said printer during both transmission and reception of said impulses, and selectively operable means for conditioning said coding circuits for either transmission or reception.

10. A combined message transmitting and receiving apparatus comprising transmitter means for sending electrical impulses to a remote station, a receiver for receiving electrical impulses from a remote station, a plurality of coding circuits common to both the transmitter means and receiver, a message printer, means operated by said coding circuits for operating said printer during both transmission and reception of said impulses, a keyboard controllingly associated with the transmitter and said coding circuits, and means selectively operable to place said common coding circuits under control of the receiver and under control of the keyboard.

11. A translation system comprising a printer, a receiver, a transmitter, a plurality of coding circuits common to both the transmitter and receiver, means operated by said coding circuits for operating said printer during both transmission and reception, manually operable keyboard means, means selectively operable to place said coding circuits under the control of said receiver or under the control of the manual operation of said keyboard, and means to actuate the transmitter in response to the operation of said keyboard.

12. In an apparatus of the class described, a rotatable printing wheel, a continuously rotatable motor, differential gearing connected between said motor and said printing wheel and including a rotatable reaction member which when held against rotation causes said gearing to drive said printing wheel but which reaction member is rotatable by said gearing when said wheel is held against rotation, means releasably holding said reaction member against rotation, means for stopping said printing wheel with a selected printing character thereof in printing position whereby said reaction member is caused to rotate, and platen means drivable by said rotating reaction member to perform a printing operation cooperatively with said selected printing character.

13. In a translating system for producing intelligence conveying characters in accordance with coded wave trains in each of which there is a series of consecutive impulses in timed relation, a continuously rotatable motor, differential gearing including a driving member in driven relation with said motor and a plurality of differentially rotatable reaction members each of which is rotatable by the driving member when the other is held against rotation, cyclically operable character producing means connected with one of said reaction members and operable in response to rotation thereof to successively produce such characters at a certain position, selector mechanism settable to stop said reaction member and resettable to an inactive standby condition, decoding means comprising a part rotatable with said reaction member to set said selector mechanism for stopping said reaction member while a character corresponding to that of a decoded wave train is produced by said character producing means, starting means responsive to the first impulse in such wave train to connect said rotatable part of the decoding means for rotation with said reaction member, means normally releasably holding the other of said reaction members against rotation, and means drivable by said other reaction member, pursuant to the stopping of said one reaction member, to reset said selector mechanism into standby position.

14. A translating system as set forth in claim 13, wherein said starting means comprises a single revolution clutch actuatable to connect said decoding means with said one reaction member, and relay means responsive to said first impulse and operable to engage said clutch.

15. A translating system as set forth in claim 13, wherein said starting means comprises an electric circuit including circuit energizing means, a relay energized by the energization of said circuit, and paired contacts separable to open said circuit, said relay including an armature normally in a projected position but retracted during energization of said relay, a rotatable clutch including jaws biased toward engagement for establishing a driving relation between said one reaction member and said decoding device, means rotatable with said clutch and abuttable against said armature while the latter is in the projected position to maintain said jaws disengaged, said circuit energizing means being responsive to said signal impulses to energize said circuit whereby said armature is retracted to permit engagement of the biased clutch jaws for causing operation of the decoding device, and means driven by said clutch driven jaw to separate said contacts and thus open said circuit to deenergize said relay whereby said armature is projected to disengage said clutch upon completing a single revolution.

16. In a translating system for producing intelligence conveying characters in accordance with coded wave trains in each of which there is a series of consecutive impulses in timed relation, a continuously rotatable motor, cyclically operable character producing means driven from said motor and effective during the operation thereof to successively produce such characters at a certain position, selectively operable stop mechanism for stopping said character producing means while a character corresponding to the selectively operated condition of said stop mechanism is produced, said mechanism comprising a plurality of selector wheels and a master wheel which are coaxial and axially spaced, a plurality of stop members respectively corresponding to said characters and spaced circumferentially about said wheels, means urging said stop members radially inwardly against the peripheries of said wheels, said wheels having notches in their peripheries and said selector wheels being rotatable in coded relation from a standby position to a selecting position for aligning the notches therein to receive the stop member corresponding to any coded relation, the notches in said master wheel being normally disaligned with any group of aligned notches on the selector wheels but being rotatable to a trip position wherein a notch is carried into alignment with any group of aligned selector wheel notches to permit the stop member associated therewith to drop thereinto in position to stop operation of the character producing means while a character corresponding to the coded relation is produced, and decoding means connectable with said motor to be rotated at a speed corresponding to the frequency of the wave train impulses to set said selector wheels in coded relation representative of the character represented by a wave train, and additional means connectable for rotation with said motor and in such phase relation with said decoding means as to rotate the master wheel to trip position immediately following set-up of the selector wheels.

17. A translation device of the character described comprising a motor, a shaft normally driven by said motor, a character printing wheel fixed to said shaft for rotation therewith, selector means for stopping rotation of said shaft and character wheel in accordance with a character to be printed, impulse operated means for effecting operation of said selector means, a rotary impulse timer loosely mounted on said shaft, clutch means for connecting said timer to said shaft for rotation therewith, and means responsive to an initial impulse for engaging said clutch means and then disengaging the clutch means after a single rotation of said shaft.

18. A translation device of the character described comprising a motor, a shaft normally driven by said motor, a character printing wheel fixed to said shaft for rotation therewith, selector means for stopping rotation of said shaft and character wheel in accordance with a character to be printed, impulse operated means for effecting operation of said selector means, a rotary impulse timer for controlling operation of said impulse operated means loosely mounted on said shaft, clutch means for connecting said timer to said shaft for rotation therewith, and means responsive to an initial impulse for engaging said clutch means and then disengaging the clutch means after a single rotation of said shaft, said selector means comprising a plurality of discs rotatably mounted on said shaft, each of said discs having a plurality of notches dissimilarly arranged thereon, and a plurality of stop means for said character wheel positioned around said discs, any one of said stop means being movable into alined notches on said discs to stop rotation of the character wheel at a predetermined position upon operation of selected discs by said impulse operated means.

19. A translation device of the character described comprising a motor, a shaft normally driven by said motor, a character printing wheel fixed to said shaft for rotation therewith, selector means for stopping rotation of said shaft and character wheel in accordance with a character to be printed, impulse operated means for effecting operation of said selector means, a rotary timing switch means for controlling operation of said impulse operated means, said selector means comprising a pluralty of selector discs rotatably mounted on said shaft, each of said discs having a plurality of notches dissimilarly arranged thereon, spring means normally urging said discs for rotation in a predetermined direction, means limiting movement of the discs under action of said spring means, individual latch means operated by said impulse operated means for selectively releasing said discs for operation under said spring means, and a plurality of stop means for said character wheel positioned around said discs, any one of said stop means being movable into alined notches on said discs to stop rotation of the character wheel at a predetermined position upon operation of selected discs by said impulse operated means, and said impulse operated means comprising a plurality of electro-magnetic means each operatively connected with a separate one of said latch means.

20. A translation device of the character described comprising a motor, a shaft normally driven by said motor, a character printing wheel fixed to said shaft for rotation therewith, selector means for stopping rotation of said shaft and character wheel in accordance with a character to be printed, electric impulse operated means associated with said selector means, and a rotary timing switch means for controlling operation of said impulse operated means, said selector means comprising a plurality of selector discs rotatably mounted on said shaft for selective operation by said impulse operated means, a master disc rotatably mounted on said shaft, each of said discs having a plurality of notches dissimilarly arranged thereon, a plurality of stop means for said character wheel positioned around said discs, any one of said stop means being movable into alined notches on said discs to stop rotation of the character wheel at a predetermined position upon operation of selected discs, and means operable by said rotary timing switch for effecting operation of said master disc after selected operation of the selector discs by the impulse operated means.

21. A translation device of the character described comprising a motor, a shaft normally driven by said motor, a character printing wheel fixed to said shaft for rotation therewith, selector means for stopping rotation of said shaft and character wheel in accordance with a character to be printed, electric impulse operated means associated with said selector means, and a rotary timing switch means for controlling operation of said impulse operated means, said selector means comprising a plurality of selector discs rotatably mounted on said shaft for selective operation by said impulse operated means, a master disc rotatably mounted on said shaft, each of said discs having a plurality of notches dissimilarly arranged thereon, spring means normally urging said discs for rotation in a predetermined direction, means limiting movement of the discs under action of said spring means, latch means operated by said impulse operated means for selectively releasing said selector discs for operation under said spring means, releasable latch means for said master disc, a plurality of stop means for said character wheel positioned around said discs, any one of said stop means being movable into alined notches on said discs to stop rotation of the character wheel at a predetermined position upon operation of the selected discs, and means operable by said rotary timing switch for releasing the latch means of said master disc after selected operation of the selector discs by the impulse operated means.

22. A translation device of the character described comprising a continuously operating motor, differential gearing connected to said motor, a shaft normally driven by said differential gearing, a character printing wheel fixed to said shaft for rotation therewith, selector means for stopping rotation of said shaft and character wheel in accordance with a character to be printed, impulse operated means for effecting operation of said selector means, a rotary impulse timer loosely mounted on said shaft, clutch means for connecting said timer to said shaft for rotation therewith, and means responsive to an initial impulse for engaging said clutch means and then disengaging the clutch means after a single rotation of said shaft.

23. A translation device of the character described comprising a continuously operating motor, differential gearing connected to said motor, a shaft normally driven by said differential gearing, a character printing wheel fixed to said shaft for rotation therewith, selector means for stopping rotation of said shaft and character wheel in accordance with a character to be printed, impulse operated means for effecting operation of said selector means, a printing platen, and means operable by said differential gearing upon stoppage of said character wheel for operating said printing platen.

24. A translation device of the character described comprising a continuously operating motor, differential gearing connected to said motor, a shaft normally driven by said differential gearing, a character printing wheel fixed to said shaft for rotation therewith, selector means for stopping rotation of said shaft and character wheel in accordance with a character to be printed, impulse operated means for effecting operation of said selector means, a printing platen, means operable by said differential gearing upon stoppage of said character wheel for operating said printing platen, and means also operable by said differential gearing upon stoppage of said character wheel for resetting said selector means upon completion of a printing operation.

25. A translation device of the character described comprising a continuously operating motor, differential gearing connected to said motor, a shaft normally driven by said differential gearing, a character printing wheel fixed to said shaft for rotation therewith, selector means for stopping rotation of said shaft and character wheel in accordance with a character to be printed, impulse operated means for effecting operation of said selector means, a second shaft, means for driving said second shaft through said differential gearing upon stoppage of said first shaft, and means operated by said second shaft for resetting said selector means.

26. A translation device of the character described comprising a continuously operating motor, differential gearing connected to said motor, a shaft normally driven by said differential gearing, a character printing wheel fixed to said shaft for rotation therewith, selector means for stopping rotation of said shaft and character wheel in accordance with a character to be printed, impulse operated means for effecting operation of said selector means, a second shaft, means for driving said second shaft through said differential gearing upon stoppage of said first shaft, a printing platen, and means operated by said second shaft for operating said printing platen.

27. A translation device of the character described comprising a continuously operating motor, differential gearing connected to said motor, a shaft normally driven by said differential gearing, a character printing wheel fixed to said shaft for rotation therewith, selector means for stopping rotation of said shaft and character wheel in accordance with a character to be printed, impulse operated means for effecting operation of said selector means, a second shaft, means for driving said second shaft through said differential gearing upon stoppage of said first shaft, a printing platen, means operated by said second shaft for operating said printing platen, means operated by said second shaft for resetting said selector means, and means also operated by said second shaft for feeding paper and inking ribbon to said printing wheel and platen.

28. A translation device of the character described comprising a continuously operating motor, differential gearing connected to said motor, a shaft normally driven by said differential gearing, a character printing wheel fixed to said shaft for rotation therewith, selector means for stopping rotation of said shaft and character wheel in accordance with a character to be printed, impulse operated means for effecting operation of said selector means, a second shaft, means for driving said second shaft through said differential gearing upon stoppage of said first shaft, and means operatively associated with the printing wheel operated by said second shaft, said transmission means comprising a plurality of planetary gears carried by said first shaft, gear means driven by said motor meshing with said planetary gears, other gear means also meshing with said planetary gears, and a driving connection between said other gear means and said second shaft.

29. A translation device of the character described comprising a continuously operating motor, differential gearing connected to said motor, a shaft normally driven by said differential gearing, a character printing wheel fixed to said shaft for rotation therewith, selector means for stopping rotation of said shaft and character wheel in accordance with a character to be printed, impulse operated means for effecting operation of said selector means, a second shaft, means for driving said second shaft through said differential gearing upon stoppage of said first shaft, means operatively associated with the printing wheel operated by said second shaft, and spring actuated braking means for normally maintaining said second shaft stationary in a predetermined angular position.

30. A translation device of the character described comprising a continuously operating motor, differential gearing connected to said motor, a shaft normally driven by said differential gearing, a character printing wheel fixed to said shaft for rotation therewith, selector means for stopping rotation of said shaft and character wheel in accordance with a character to be printed, impulse operated means for effecting operation of said selector means, a second shaft, means for driving said second shaft through said differential gearing upon stoppage of said first shaft, means operatively associated with the printing wheel operated by said second shaft, and spring actuated braking means for normally maintaining said second shaft stationary in a predetermined angular position, said braking means including a cam surface providing for positively rotating the second shaft to said predetermined angular position.

31. Translating apparatus comprising a transmitter and a receiver for sending and receiving electrical impulses, a plurality of coding circuits common to both the transmitter and receiver, a printer having a rotary type wheel, means operated by said coding circuits for operating said printer during both transmission and reception of said impulses, and selectively operable means for conditioning said coding circuits for either transmission or reception.

32. Translating apparatus comprising a transmitter and a receiver for sending and receiving electrical impulses, a plurality of coding circuits common to both the transmitter and receiver, a printer having a rotary type wheel, means normally effecting continuous rotation of said type wheel, means operated by said coding circuits for stopping rotation of said type wheel and effecting a printing operation during both transmission and reception of said impulses, and selectively operable means for conditioning said coding circuits for either transmission or reception.

33. Translating apparatus comprising a transmitter and a receiver for sending and receiving electrical impulses, a plurality of coding circuits common to both the transmitter and receiver, a printer, means operated by a plurality of timed impulses on said coding circuits for operating said printer to print predetermined characters during both transmission and reception of said impulses, and selectively operable means for conditioning said coding circuits for either transmission or reception.

34. A translation device of the character described comprising a motor, a shaft normally driven by said motor, a character printing wheel fixed to said shaft for rotation therewith, selector means for stopping rotation of said shaft and character wheel in accordance with a character to be printed, electric impulse operated means associated with said selector means, a rotary impulse timer for controlling operation of said impulse operated means loosely mounted on said shaft, clutch means for connecting said timer to said shaft for rotation therewith, and means responsive to an initial impulse for engaging said clutch means and then disengaging the clutch means after a single rotation of said shaft, said selector means comprising a plurality of selector discs rotatably mounted on said shaft for selective operation by said impulse operated means, a master disc rotatably mounted on said shaft, spring means normally urging said discs for rotation in a predetermined direction, means limiting movement of the discs under action of said spring means, latch means operated by said impulse operated means for selectively releasing said selector discs for operation under said spring means, releasable latch means for said master disc, and means operable by said rotary impulse timer for releasing the latch means of said master disc after selected operation of the selector discs by the impulse operated means.

35. A translation device of the character described comprising a motor, a shaft normally driven by said motor, a character printing wheel fixed to said shaft for rotation therewith, selector means for stopping rotation of said shaft and character wheel in accordance with a character to be printed, electric impulse operated means associated with said selector means, a rotary timing switch means for controlling operation of said impulse operated means, said selector means comprising a plurality of selector discs rotatably mounted on said shaft for selective operation by said impulse operated means, a master disc rotatably mounted on said shaft, spring means normally urging said discs for rotation in a predetermined direction, means limiting movement of the discs under action of said spring means, latch means operated by said impulse operated means for selectively releasing said selector discs for operation under said spring means, releasable latch means for said master disc, and a member carried by said rotary timing switch and rotatable therewith for mechanically releasing said latch means for said master disc after selected operation of the selector discs by the impulse operated means.

WILLIAM U. WATSON.